United States Patent [19]

Landry

[11] 4,245,340

[45] Jan. 13, 1981

[54] DATA LINK FOR DIGITAL CHANNEL BANK SYSTEMS

[75] Inventor: Joseph E. Landry, Atkinson, N.H.

[73] Assignee: Bell Telephone Laboratories, Incorporated, Murray Hill, N.J.

[21] Appl. No.: 966,637

[22] Filed: Dec. 5, 1978

[51] Int. Cl.³ .............................................. H04J 3/12
[52] U.S. Cl. .................................................... 370/111
[58] Field of Search ................... 179/15 BY; 370/110, 370/111

[56] References Cited

U.S. PATENT DOCUMENTS

| | | | |
|---|---|---|---|
| 3,549,814 | 12/1970 | Jaeger | 179/15 BY |
| 3,909,540 | 9/1975 | Maryscuk | 179/15 BY |
| 3,939,307 | 2/1976 | Bishop | 179/15 BY |
| 3,970,799 | 7/1976 | Colton | 179/15 BY |
| 4,135,060 | 1/1979 | Heckel | 179/15 BY |

Primary Examiner—David L. Stewart
Attorney, Agent, or Firm—John K. Mullarney

[57] ABSTRACT

A data link is additionally provided in a digital channel bank type transmission system without displacing or degrading any present voice or signaling channel capacities. The additional data channel is obtained by "borrowing" a major portion of the signaling subframe channel. A transmit circuit (FIG. 3 and FIG. 8) serves to time division multiplex a data channel into the signaling subframe channel by transmitting the signaling framing pattern in an intermittent periodic manner with preselected data bits interposed therebetween (waveform TDATA of FIG. 5). At the remote receiving terminal, a subframe recovery circuit (FIG. 7) serves to recover the signaling framing pattern embedded in the multiplexed subframe channel. A receive circuit (FIG. 4) at the remote terminal is responsive to a signal from the subframe recovery circuit to separate out the data bits in the multiplexed subframe channel.

7 Claims, 9 Drawing Figures

DATA LINK FOR DIGITAL CHANNEL BANK SYSTEMS

TECHNICAL FIELD

The present invention relates to digital transmission systems and, more particularly, to the addition of a data link in a digital channel bank type transmission system without displacing any voice or signaling channel capacities.

BACKGROUND OF THE INVENTION

The first step in understanding a transmission system is to define the basic broadband transmission unit. For analog systems, this would be a channel group, which prior to transmission is typically multiplexed into supergroups and mastergroups. For digital transmission, the basic unit is the DS1 signal. The DS1 signal developed by a digital channel bank (e.g., the D-3 Channel Bank, as disclosed in U.S. Pat. No. 4,059,731, issued Nov. 22, 1977 to J. H. Green and J. E. Landry) and transmitted over a T-1 transmission line (1.544 megabits per second) is, at present, the workhorse of the Bell System digital transmission network.

The format of the DS1 digital signal consists of 24 eight-bit words and one framing bit for a total of 193 bits per frame. The 24 words typically represent 24 separate and distinct messages deposited in 24 separate and distinct channels. The words are PCM (pulse code modulation) encoded and the least significant bit (i.e., eighth bit) of a channel is periodically dedicated for signaling purposes.

Considering the signaling in more detail, eight bits are used for transmitting digital information (e.g., PCM encoded voice) for each channel in five of every six frames, and the eighth bit is borrowed for signaling purposes in every sixth frame. To identify these signaling digits, signaling framing information is inserted in the bit stream in the framing bit position of every other frame, i.e., the subframes. The subframe pattern that is used is 111000111000111 . . . The signaling frame is defined as the frame which follows a transition in the subframe pattern. The algorithm used by a receiving terminal to extract signaling information is to monitor the subframe pattern for a transition (a 1 to 0 or 0 to 1) and to gate the eighth bit of each channel to signaling circuitry during the signaling frame that follows each transition.

So much for the DS1 signal itself. This signal format has served the system well up till now. However, the need for additional data channel capacity is becoming more critical in D-type (digital channel bank) systems that use the standard DS1 format. Furthermore, with the possible attractive use of D-type systems for loop plant applications, an additional data channel is useful for the transmittal of channel activity (i.e., concentration). A proposal put forth heretofore has been to additionally time share (i.e., borrow) one or more bits (e.g., the eighth or least significant bit) of the information channels. This introduces unacceptable transmission impairments, however, and so has never been seriously pursued. Another proposal, first set forth in the article "D2 Channel Bank: Digital Functions" by A. J. Cirillo et al, *Bell System Technical Journal,* Volume 51, October 1972, pages 1701–1712, has been to substitute directly a data channel (CCIS) for the signaling subframe channel. This provides for a 4-kilobit per second data channel. The substitution of the eighth bit for signaling purposes would thus be discontinued and presumably the necessary signaling information carried in the CCIS data channel. This latter proposal, unfortunately, introduces a basic incompatibility into the digital network and it sacrifices signaling capabilities, e.g., overall signaling channel capacity is reduced.

SUMMARY OF THE INVENTION

In accordance with the present invention, a data link is additionally provided in a digital channel bank type transmission system without displacing or degrading any present voice or signaling channel capacities. Briefly, an additional data channel is obtained by "borrowing" a major portion of the signaling subframe channel. The signaling framing pattern is transmitted in an intermittent, periodic fashion and the desired data (e.g., concentration, maintenance, alarming, etc.,) is interposed between—i.e., it is time division multiplexed with the signaling pattern.

In a preferred embodiment of the invention data link apparatus comprises a transmit circuit that serves to time division multiplex a data channel into the signaling subframe channel by transmitting the signaling framing pattern in an intermittent periodic manner with preselected data bits interposed therebetween. At the remote receiving terminal, a subframe recovery circuit serves to recover the signaling framing pattern embedded in the multiplexed subframe channel. A receive circuit of the data link at the remote terminal is responsive to a signal from the subframe recovery circuit to separate out the data bits in the multiplexed subframe channel.

It is a feature of the invention that predetermined bits are added to and given codes omitted from the interpolated data bit stream to prevent false resynchronization of the subframe recovery circuit.

BRIEF DESCRIPTION OF THE DRAWINGS

A complete understanding of the present invention and of the above and other features thereof can be gained from a consideration of the following detailed description when the same is read in conjunction with the accompanying drawings in which.

DETAILED DESCRIPTION

Figure 1:
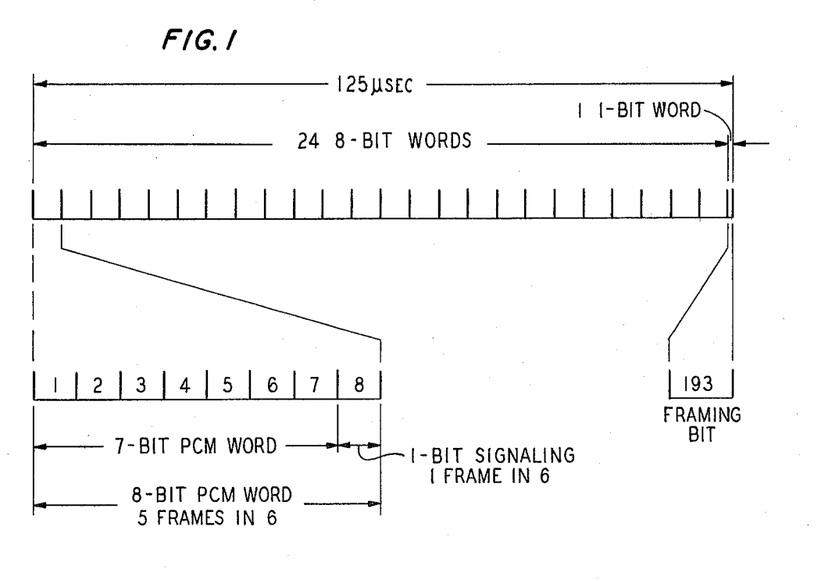
FIG. 1 illustrates the format of a DS1 digital signal.

To facilitate a clear comprehension of the present invention, yet at the risk of redundancy, the aforementioned DS1 signal will be considered in greater detail at this point. As illustrated in FIG. 1, all eight bits of a channel are used for carrying message information in five of every six frames, and the eighth bit (D8) is borrowed for signaling purposes in every sixth frame. Each signaling bit of each channel relates only to the signaling information for that particular channel; and, all of the signaling bits of a digital group occur in the same (one-in-six) signaling frame. The borrowed D8 digit of a channel is available for signaling more than 1300 times per second, which suffices to transmit both dial pulses and the necessary supervisory information (e.g., telephone receiver off-hook or on-hook).

The requisite framing information is transmitted in the 193rd pulse position of every other frame. Thus, the framing pattern which results is as follows: ---1---x---0---x---1---x---0---x---1---x. The alternating 1 and 0 bits are, of course, the valid framing bits. The frames which do not contain valid framing bits are called signaling subframes and the 193rd bits of these frames are used to send signaling framing information.

For present purposes, the framing pattern itself is of little consequence and can be disregarded. The signaling subframe pattern is, however, of particular significance to the following description and this pattern is as follows:
---1---x---1---x---1---x---0---x---0---x---0---x---1---x---1---.
Each entry above (---1, ---0, ---x) represents a frame, and the x's here represent "don't cares" as far as signaling is concerned (they are, in fact, the framing pattern bits previously described as successively alternating between 1 and 0). The subframe pattern consists of three 1's alternating with three 0's. The signaling frame (i.e., the frame of D8 signaling bits) is the frame that immediately follows a 1 to 0 or 0 to 1 transition in the subframe pattern; it is shown underlined above. As indicated in this signaling pattern supra, a signaling frame occurs every sixth frame. So much for the DS1 signal itself. It should be understood, however, that the DS1 digital signal has been described herein merely for purposes of illustrating the principles of the present invention and it will be apparent to those in the art that the inventive concepts herein disclosed can be used in other digital transmission systems which utilize other and different digital data formats.

Figure 2:
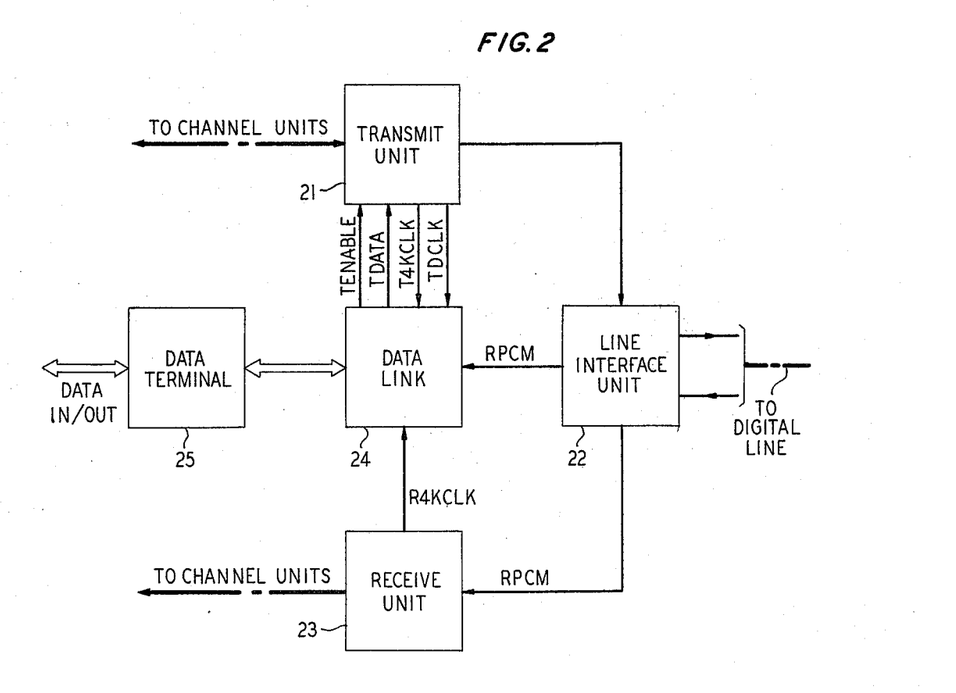
FIG. 2 is a simplified block diagram of a portion of a digital channel bank incorporating data link apparatus in accordance with the present invention.

Turning now to FIG. 2 of the drawings, there is shown part of a typical digital channel bank terminal which incorporates data link apparatus in accordance with the present invention. The transmit unit 21 receives PAM (pulse amplitude modulation) samples, as well as signaling data, from the channel units (not shown) and it encodes each PAM sample into and 8-bit PCM (pulse code modulation) word. After coding, the words are prepared for transmission over a digital line (e.g., a T1 transmission line). Framing and subframing bits are added, and in every sixth frame signaling bits are substituted for the eighth bit of the PCM coded words. The composite multiplexed bit stream (e.g., the DS1 digital signal of FIG. 1) from the transmit unit 21 is then coupled to the digital line via the line interface unit 22 which converts the unipolar bit stream to a bipolar format.

In the receiving direction, the converse of the above-described operations is carried out. The incoming digital bit stream from the distant terminal is coupled to the receive unit 23 via the interface unit 22 which converts the received bipolar signal to the unipolar format. The received digital bit stream (RPCM) is also delivered to the data link apparatus 24. The receive unit 23 serves to convert each received PCM code word into a PAM sample and it delivers the samples to the channel units over a PAM bus. The receive unit also serves to extract the signaling bits from the incoming bit stream and deliver the same to the channel units via a signaling bus. As previously described, the signaling framing pattern is relied on to identify these signaling bits.

The foregoing, admittedly brief, description of a digital channel bank should provide an adequate background to facilitate an understanding of the present invention. Digital channel banks have been in use since the early 1960's and they have been extensively described in the literature—see, for example, the D2 Channel Bank article cited above, as well as the accompanying articles in the October 1972 issue of the *Bell System Technical Journal;* also, "The D3 Channel Bank" by W. B. Gaunt et al, *Bell Laboratories Record,* August 1972, pages 229–233 and "D4: up-to-date channel bank for digital transmission plant" by W. G. Albert et al, *Bell Laboratories Record,* March 1977, pages 66–72.

Figure 3:
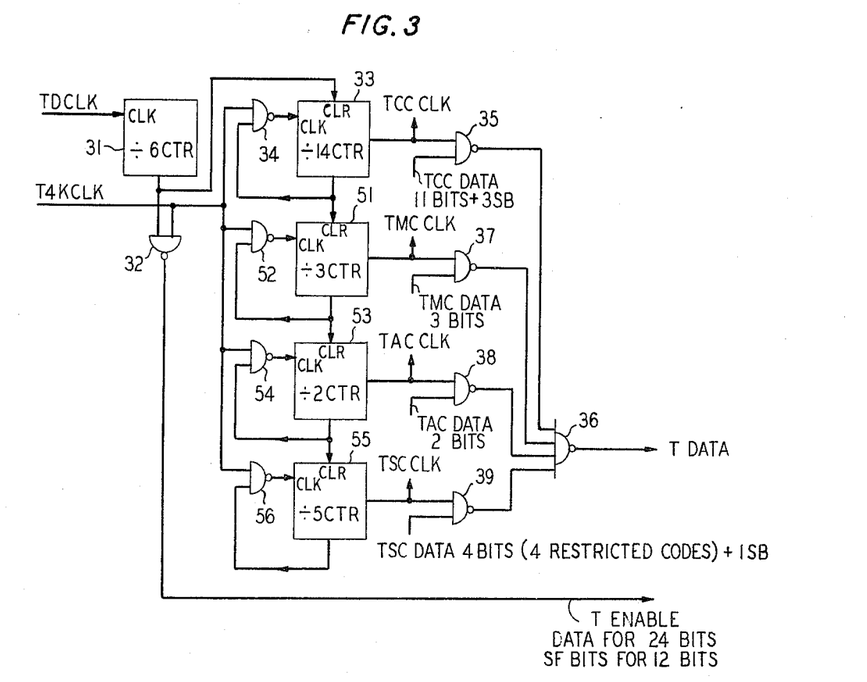
FIG. 3 is a detailed schematic diagram of the transmit circuit of the data link apparatus shown in block form in FIG. 2.
Figure 4:
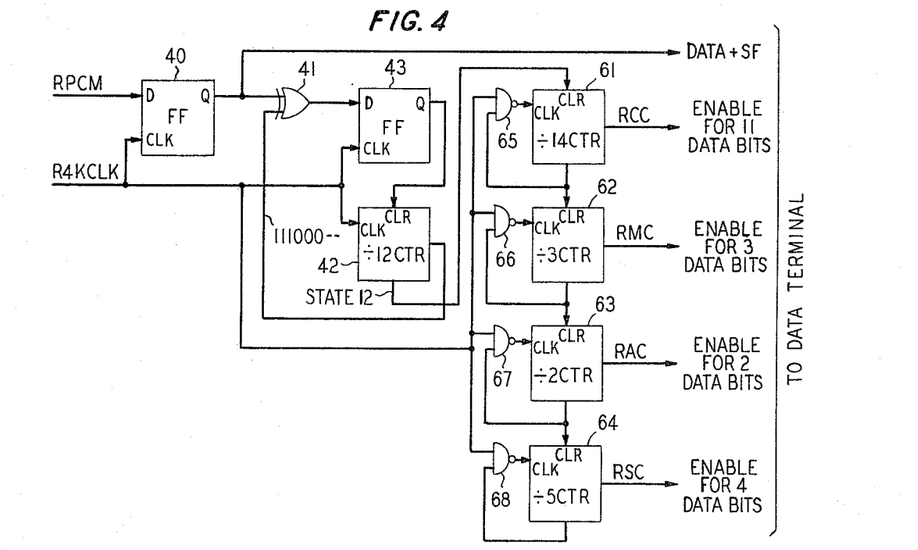
FIG. 4 is a detailed schematic diagram of the receive circuit of the data link apparatus of FIG. 2.

The data link 24 includes a transmit circuit and a receive circuit, which are shown in FIGS. 3 and 4, respectively, to be described in detail hereinafter. For present purposes it is sufficient to note that the transmit circuit of the data link 24 operates in response to clock signals (T4KCLK, TDCLK) from the transmit unit 21 to form a predetermined sequence of data bit blocks and concurrent timing signals. The data itself is obtained from the data terminal 25, which is accessed by timing signals from the data link. The sequence of data bits (TDATA) is then multiplexed into the signaling subframe channel under the control of a timing signal TENABLE generated by the transmit circuit of the data link. The receive circuit of the data link 24 receives the incoming digital bit stream (RPCM) from the interface unit 22 and a given clock signal (R4KCLK) from the receive unit 23 and it utilizes the latter to separate out the multiplexed subframe channel (of signaling framing bits and interpolated data). Then, in response to a signal from applicant's subframe recovery circuit, the receive circuit of the data link 24 generates timing signals which are used to further separate out the data bits in the multiplexed subframe channel. The data bits are delivered to the data terminal 25.

For present purposes, the data terminal 25 can be considered simply as an interface unit comprising input and output buffer stores of known configuration, with write-in and read-out carried out automatically or even manually in accordance with known techniques. The present invention is in no way limited to a data terminal of any particular circuit configuration nor is it limited in any fashion by the content of the data to be transmitted between locations. However, to facilitate an understanding of the invention, examples will be set forth herein of data which might be transmitted between typical channel bank terminals. The data link that is additionally provided in accordance with the present invention can be used, for example, for the transmission of concentration, maintenance, alarming, and (protection) switching data.

Concentration is a widely used procedure whereby a large number of subscribers share (e.g., in time) a lesser number of transmission channels. For example, 80 subscribers may be concentrated onto 24 T1-type channels. The concentration of voice subscribers onto digital transmission channels by a digital concentrator is carried out today. To transmit concentration data, a digital concentrator would automatically, and periodically, deliver a data bit block of concentration information to the data terminal 25 where it would be stored in the output buffer store. At the appropriate time the output buffer store would be accessed (i.e., read) by the data link apparatus 24 and the concentration data bit block then multiplexed into the subframe channel in the manner to be described.

The self-descriptive maintenance and alarming functions are universally used in digital channel bank systems and hence no explanation of the same herein would appear necessary. Maintenance and alarming data bit blocks can be written into buffer store, either manually or automatically, and then accessed by the data link 24 at the appropriate time in the manner to be described.

The term "protection switching" has reference to a commonly utilized technique whereby a spare or standby transmission line is provided to guard against service interruptions. When a working transmission line becomes defective (e.g., excessive errors) the protection switching equipment will switch the transmission signal to the spare. In this event, the remote terminal must be notified accordingly. If such a switch were to be made, a block of data bits (e.g., 4 bits) indicative of the same would be delivered to the data terminal 25 to be stored in the output buffer store. The buffer store is accessed by the data link 24 and the (protection) switch data bit block is then multiplexed into the subframe channel in the manner to be described. The foregoing represents some obvious uses of the data link provided in accordance with the invention. Other data uses will be readily apparent to those skilled in the art. Accordingly, it must be understood that the principles of the present invention are not limited in any manner by the data desired to be sent between channel banks.

Figure 7:
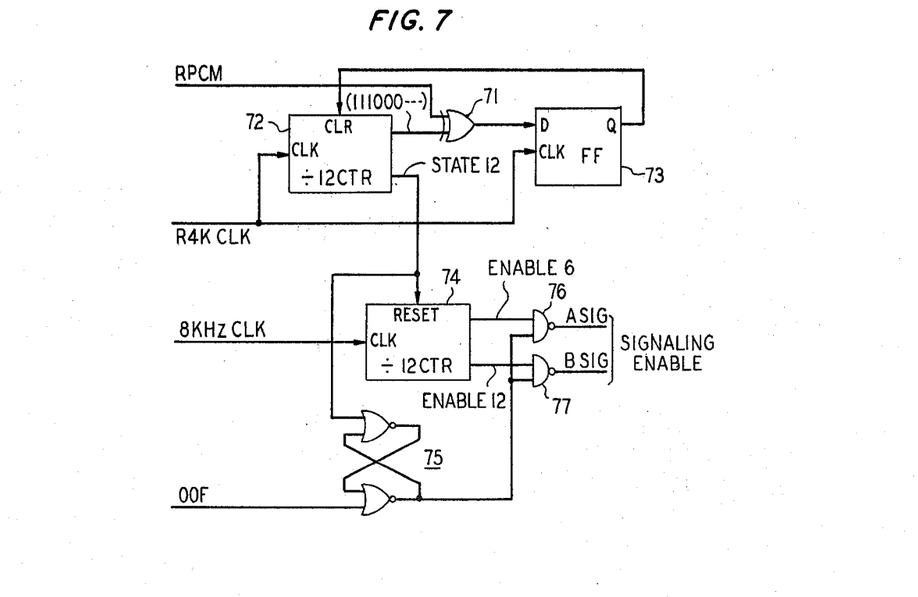
FIG. 7 is a detailed schematic diagram of the subframe recovery circuit.

Before dealing with the data link apparatus 24 in greater detail, it is perhaps advantageous at this point to consider the operation of applicant's subframe recovery circuit, shown in FIG. 7 of the drawings. The name of this circuit is descriptive since it serves to recover the signaling subframe pattern embedded in the multiplexed subframe channel. It is convenient to consider the subframe recovery circuit as part of the receive unit 23 since the recovery of the signaling subframe pattern is a requisite to the receive unit's function of extracting the signaling bits from the incoming digital bit stream. However, as a practical matter, it is part and parcel of the data link apparatus of the invention, as will be more evident hereinafter. In any case, the incoming digital bit stream RPCM is coupled to the exclusive-OR circuit 71 of FIG. 7 and a 4 kHz clock signal derived from the channel bank receive unit 23 is delivered to the clock (CLK) input of the divide-by-twelve ($\div 12$) counter 72. These 4 kHz clock pulses, designated hereinafter as R4KCLK, are synchronized to the subframe pulses since the channel bank receiver is presumably framed on the received framing pulses. The $\div 12$ counter circuit 72 has an output the same as the subframe pattern, i.e., 111000111000 . . . This output pattern is compared (in the exclusive-OR 71) to the input subframe bits which, of course, should have the very same pattern. However, if the two patterns do not match, the exclusive-OR 71 delivers an energizing "1" signal to the D input of the D-type flip-flop 73. The R4KCLK clock signal serves to transfer this D-input to the Q output of flip-flop 73 and this Q output is used to clear (CLR) the $\div 12$ counter 72 and thereby reset the same to its initial condition. Since the D-type flip-flop 73 is only clocked during the subframe pulse periods, all other outputs of the exclusive-OR 71 are effectively ignored. The ubiquitous D-type flip-flop is well known to those in the art and is manufactured by Western Electric Company, Texas Instruments, Incorporated, and numerous others. The described operation continues and the counter 72 is continually cleared or reset until a match between the two patterns occurs. When the two patterns match, the exclusive-OR, of course, is disabled and the $\div 12$ counter 72 begins to count up as each R4KCLK pulse is delivered to the clock (CLK) input of the counter. When the two patterns match for 12 consecutive times, state 12 is reached and the device-by-twelve ($\div 12$) counter 74 is reset by the "state 12" signal from counter 72. Counter 74, by this action, is thus synchronized to the incoming subframe pattern. The $\div 12$ counter 74 is clocked by the input 8 kHz clock, which is synchronized to the 193rd bit position (i.e., the frame/subframe bits) of the incoming digital signal. Thus, the counter 74 counts at the frame rate. The "state 12" signal from counter 72 is also used to set the flip-flop 75, which thereby delivers an enabling signal to the NAND gates 76, 77. However, if the receiving terminal loses frame, an out-of-frame (OOF) signal is sent to the flip-flop 75 to reset the same and thereby disable the gates 76, 77. The counter 74 delivers an enabling "0" pulse to the NAND gate 76 every 6th frame and a similar signal to the NAND gate 77 every 12th frame. The output signals of gates 76, 77 are used to extract the signaling information from the incoming digital bit stream in the regular manner. Two gates 76, 77 are shown herein because 4-state signaling is assumed (see the Cirillo et al article supra for a brief discussion of 4-state signaling utlilizing two signaling channels, A and B). For two state signaling only a single AND gate (e.g., gate 76) is necessary, the gate then being enabled by the counter 74 every 6th and 12th frame.

Once the counter 74 has been reset, as previously described, it is free-running and is comparable to a flywheel. The counter 72 will send a reset signal to the counter 74 every time it counts to state 12, but if the circuit is functioning properly the counter 74, at that time, will again be in its initial or reset state. It should be evident at this point that the incoming subframe pattern can be substantially removed and the receiving terminal will still send the correct signaling information to the channel units as long as the channel bank does not lose frame.

Figure 5:
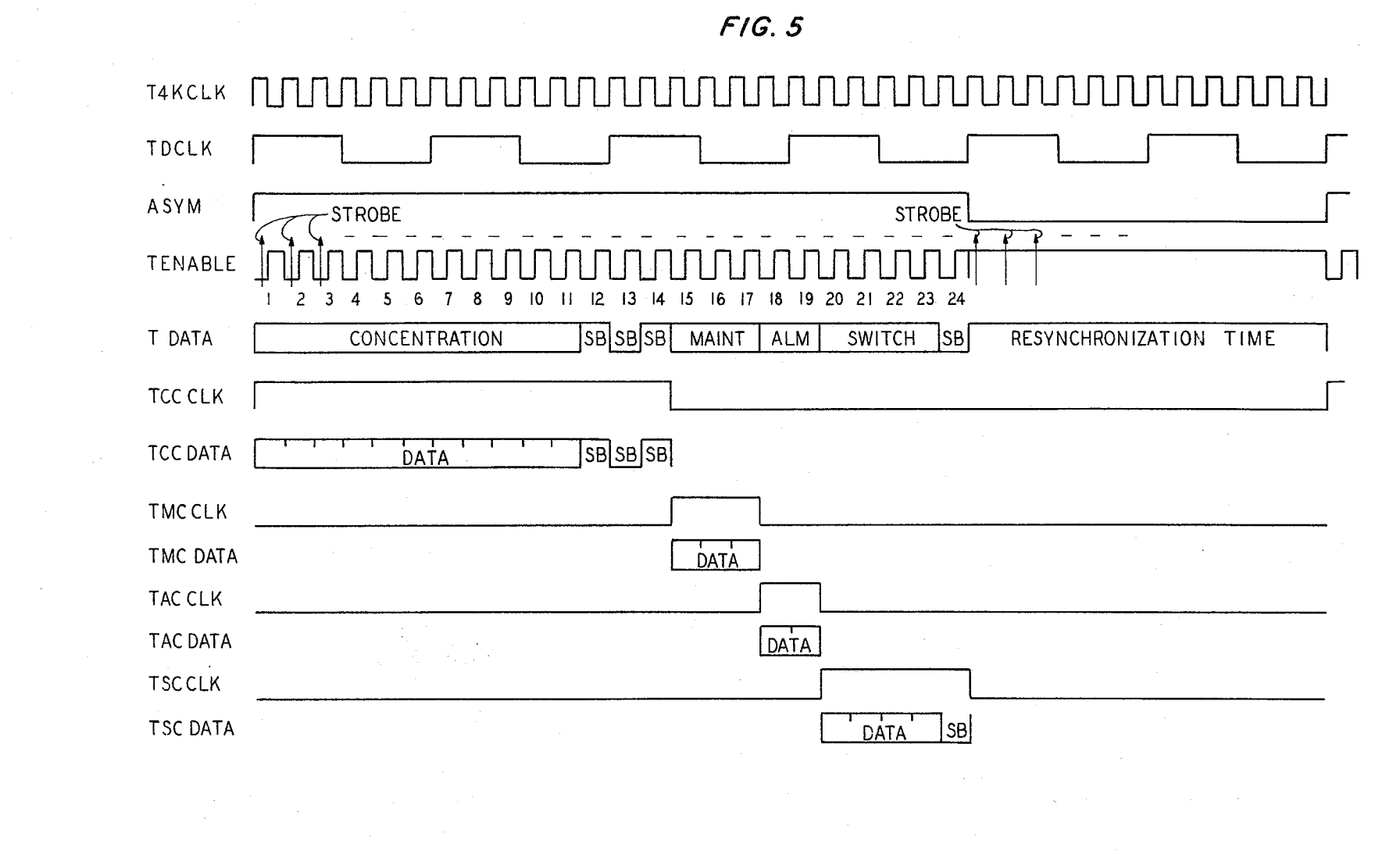
FIG. 5 shows waveforms useful in the explanation of the operation of the transmit circuit of FIG. 3.

Turning now to the details of the data link apparatus 24 of FIG. 2, the transmit circuit of the same is shown in FIG. 3 of the drawings. The waveforms of FIG. 5 are useful in understanding the operation of the transmit circuit of FIG. 3. The transmit circuit is operative in response to the clock signals T4KCLK and TDCLK received from the transmit unit 21. These clock signals are shown in FIG. 5. The T4KCLK signal is a 4 kHz clock that is synchronous with the subframe bits. The TDCLK signal is simply a division of T4KCLK and it has a repetition rate that is one-sixt! that of the T4KCLK clock—or a nominal frequency of 667 Hz. The TDCLK signal is coupled to the clock (CLK) input of the divide-by-six ($\div 6$) counter circuit 31. As the name implies, the $\div 6$ counter circuit 31 divides the input clock by six to provide an asymmetric output waveform with a repetition rate one-sixth that of the input TDCLK, as shown by the waveform in FIG. 5 designated ASYM. The derivation of an asymmetric waveform by means of combinational logic selectively connected to a counter is a well known technique that is commonly used in the art and hence no detailed description of the same herein is thought necessary. The ASYM and T4KCLK signals are delivered to the input of NAND gate 32, whose output is designated TENABLE and is shown in FIG. 5 of the drawings. When ASYM is high, or a logic "1", the NAND gate 32 provides, at its output, an inverted version of T4KCLK; and, when ASYM is a logic "0" the NAND gate is disabled and TENABLE is high ("1"). The use of this TENABLE signal will be covered hereinafter.

The ASYM signal is coupled to the clear (CLR) input of the divide-by-fourteen (÷14) counter 33. An output of counter 33 is coupled back to the NAND gate 34. The T4KCLK signal is also delivered to the input of NAND gate 34, and the output of the latter is connected to the clock (CLK) input of the ÷14 counter 33. This circuit operates as follows. When the ÷14 counter 33 is in its initial or cleared state, an energizing signal (a logical "1") is delivered to the NAND gate 34 to enable the same to couple the T4KCLK to the clock input of the counter 33. The counter 33 will thus count to fourteen (14) at the T4KCLK rate, at which time its output to NAND gate 34 goes to zero (logic "0") and the gate 34 is thereby disabled. This terminates the counting operation of the ÷14 counter 33. An output of counter 33 is coupled to the output NAND gate 35, this counter output being illustrated in FIG. 5 by the waveform designated TCC CLK. The TCC CLK waveform is high (a logical "1") for fourteen T4KCLK periods; i.e., it is high till the counter counts up to fourteen. The TCC CLK signal comprises an enabling signal for the NAND gate 35. The TCC CLK signal is also delivered to the data terminal 25 where it is used as an access signal to read-out from store a predetermined data bit block (e.g., concentration data). This data bit block comprises, for example, eleven (11) bits of data, to which is added three "spoiler" bits (SB) for a purpose to be described hereinafter. This 14-bit block (11 data bits and 3 spoiler bits) is illustrated in FIG. 5 by the waveform labelled TCC DATA. The TCC CLK signal from the counter 33 enables the NAND gate 35 to pass the input TCC DATA bit block to NAND gate 36. At this time, the NAND gates 37, 38, 39 are all disabled and their outputs are thus logical ones. Accordingly, the NAND gate 36 is enabled to deliver the TCC DATA bit block to the output designated TDATA.

The first mentioned output of counter 33 is also coupled to the clear (CLR) input of the divide-by-three (÷3) counter 51. The output of the ÷14 counter 33 that serves to disable the gate 34 (after the counter 33 counts to 14) further serves to clear (CLR) or reset the ÷3 counter 51. The counter 51 and its input NAND gate 52 are connected and function in a manner similar to counter 33 and gate 34. When the ÷3 counter 51 is in its cleared or reset state, an energizing signal (a logical "1") is deivered to the NAND gate 52 to enable the same to couple the T4KCLK signal to the clock (CLK) input of the counter 51. The counter 51 will thus count to three (3), at which time its output to NAND gate 52 goes to zero (logic 0) and gate 52 is thereby disabled. This terminates the counting operation of the ÷3 counter 51. An output of counter 51 is coupled to the output NAND gate 37, this counter output being illustrated in FIG. 5 by the waveform designated TMC CLK. The TMC CLK waveform is high (a logical "1") for three T4KCLK periods; i.e., it is high until the counter reaches the count of 3. The TMC CLK signal comprises an enabling signal for the NAND gate 37. The TMC CLK signal is also delivered to the data terminal 25 where it is used as an access signal to read-out from store another predetermined data bit block (e.g., maintenance data). This data bit block comprises, for example, 3 bits of data. The 3-bit block is illustrated in FIG. 5 by the waveform labelled TMC DATA. The TMC CLK signal from the counter 51 enables the NAND gate 37 to pass the input TMC DATA bit block to NAND gate 36 and since the output NAND gates 35, 38, 39 are all disabled at this time, the NAND gate 36 is enabled to deliver the TMC DATA bit block to the output, designated TDATA.

When the counter 51 counts out (i.e., after it counts to 3), the ÷2 counter 53 is reset or cleared and the NAND gate 54 is thereby enabled to couple the T4KCLK signal to the CLK input of counter 53; the ÷2 counter 53 then counts to two (2), at which time the NAND gate 54 is disabled and the counting operation thence terminated, all in the same manner as heretofore described. The counter 53 output is coupled to the NAND gate 38, this output being illustrated in FIG. 5 by the waveform designated TAC CLK. The TAC CLK waveform is high (a logical "1") for two T4KCLK periods, i.e., it is high until counter 53 counts up to 2. The TAC CLK signal is delivered to the data terminal 25 where it is used to read-out from store a predetermined data bit block (e.g., alarm data) comprising 2 bits of data. This 2-bit block is illustrated in FIG. 5 by the waveform designated TAC DATA. The TAC CLK signal from the counter 53 enables the NAND gate 38 to pass the input TAC DATA bit block to NAND gate 36 and thence via the enabled NAND gate 36 to the output, designated TDATA.

After the counter 53 registers a 2 count and is then disabled, the ÷5 counter 55 is reset or cleared and the NAND gate 56 is thereby enabled to couple the T4KCLK signal to the CLK input of counter 55; the ÷5 counter 55 then counts to five (5), at which time the NAND gate 56 is disabled and the counting operation thereby terminated, again in the same manner as previously described. The counter output is coupled to the NAND gate 39, this output being illustrated in FIG. 5 by the waveform designated TSC CLK. The TSC CLK waveform is high (a logical "1") for five T4KCLK periods, i.e., it is high until counter 55 counts to 5. the TSC CLK signal is delivered to the data terminal 25 where it is used to read-out from store still another predetermined data bit block (e.g., protection switching or "switch" data). This data bit block comprises, for example, four (4) bits of data, to which is added one spoiler bit (SB). This 5-bit block (4 data bits and 1 spoiler bit) is illustrated in FIG. 5 by the waveform labelled TSC DATA. The TSC CLK signal from the counter 55 enables the NAND gate 39 to pass the input TSC DATA bit block to NAND gate 36 and thence via the enabled gate 36 to the output, designated TDATA.

The sequence of data bit blocks from the output of the transmit circuit of FIG. 3 is shown in FIG. 5 by the waveform designated TDATA. The portion of this waveform labelled "resynchronization time" is, of course, the time during which the signaling framing bits (SF) are transmitted. Thus, the signaling subframe channel will consist of a data sequence of twenty-four (24) bits, followed by twelve (12) SF bits, followed by 24 data bits, followed by 12 SF bits, and so on.

Figure 8:
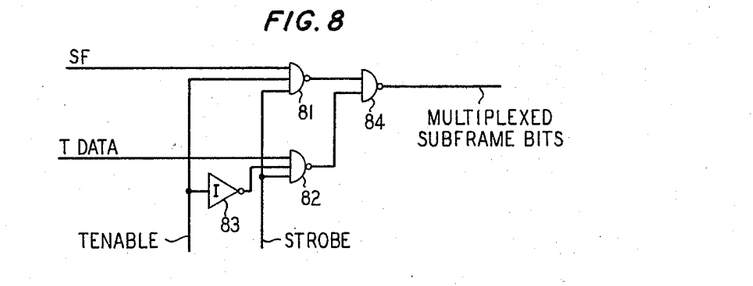
FIGS. 8 and 9 show some simple logic circuits that are used in carrying out the principles of the present invention.

The sequence of data bits (TDATA) is readily multiplexed into the signaling subframe channel under the control of the timing signal TENABLE generated by the transmit circuit of FIG. 3. A simple logic circuit which can be used for this multiplexing operation is shown in FIG. 8. The signaling framing bits SF, that are normally generated by a digital channel bank, are coupled to the input of the NAND gate 81. The sequence of data bits TDATA is delivered to the input of the NAND gate 82. The TENABLE signal, generated by the transmit circuit of FIG. 3 and shown in FIG. 5, is delivered directly to the NAND gate 81, and it is also coupled to the input of NAND gate 82 via the inverter 83. A strobe pulse is generated by the transmit unit 21 for each and every time slot (i.e., for every bit position in a frame). The generation of such strobe pulses is customary in digital channel banks. The phase ($\phi$) of the strobe pulses utilized by the logic circuit of FIG. 8 is shown in FIG. 5 by several strobe pulses superimposed on the TENABLE waveform. The strobe pulses delivered to the NAND gates 81 and 82 for each and every subframe bit will tned to enable said gates. However, as shown in FIG. 5, for the first 24 subframe bit positions, TENABLE is low (a logical "0") during the occurrence of a strobe, and therefore the NAND gate 81 is disabled. The TENABLE signal is inverted in inverter 83 and thus the gate 82 is enabled while the gate 81 is disabled. The strobe pulses and the inverted TENABLE signal, therefore, enable the gate 82 to pass the input TDATA to the output NAND gate 84 and thence via the enabled gate 84 to the output lead labelled "multiplexed subframe bits." During the resynchronization time, however, the NAND gate 81 is enabled by the TENABLE signal, and the NAND gate 82 is disabled by the inverted TENABLE. Accordingly the periodic occurrence of the strobe pulses will enable the gate 81 to pass the input signaling framing bits SF (111000111000) to the lead labelled "multiplexed subframe bits" via the enabled NAND gate 84. The multiplexed subframe bits are then further multiplexed into the composite multiplexed bit stream developed by the transmit unit 21. This multiplexing of the subframe bits into the composite multiplexed bit stream is carried out in the regular manner.

To prevent false resynchronization of the subframe receive recovery circuit and to ensure resynchronization would be possible limitations must be placed on the data sequence transmitted in the subframe channel. That is, a 111000 data sequence must not be transmitted twice in succession and the subframe recovery circuit must be in its reset state when the subframe pattern is inserted. To this end, the "spoiler" bits (SB) are inserted in the indicated positions in the TDATA bit sequence (see FIG. 5); also, the 4-bit block of switch data is limited to twelve (12) of the sixteen (16) possible code combinations; those codes omitted are 0111, 1110, 1100, 1111. From a close examination of the TDATA waveform of FIG. 5, it will be evident that the use of the illustrated spoiler bits in the indicated time slots or bit positions (i.e., for time slot 12, SB=1; for time slot 13, SB=0, etc.) and the indicated restriction of the switch data completely eliminates any possibility of false resynchronization. For example, if the 11-bit concentration data bit block should assume the bit sequence 11100011100, the possibility of false resynchronization is still avoided since the 12th bit in this sequence would be the spoiler bit, SB=1. It should be evident at this point that if the data block sequence is altered in any manner (e.g., switch and alarm data preceding the concentration data) it may be necessary to alter the values and positions of the spoiler bits and/or the code combination restrictions heretofore described. Also, of course, if other and different data is transmitted between channel banks, other and different spoiler bits and their locations, as well as other and different code restrictions, will likely be necessary. However, given the data or data bit blocks to be transmitted between channel banks, it is considered to be within the skill of one in the art to provide the proper combination of spoiler bits and code restrictions which will insure against false resynchronization and to insure proper resynchronization on the subframe pattern.

The placing of the spoiler bits in the data bit sequence can be readily carried out by the simple expedient of permanently storing the same in the output buffer store of the data terminal 25. For example, the spoiler bit pattern 101, which follows the concentration data bit block, can be permanently stored in the output buffer store in juxtaposition to the 11-bits of storage dedicated to the concentration bit block. During a read-out operation, the 11-bits of concentration data are serially read out from store, with the read-out of the spoiler bits occurring immediately thereafter. This 14-bit read-out from the buffer store of the data terminal is carried out in response to the access signal TCC CLK received from the data link 24. Alternatively, the 11-bit concentration data bit block can be read out of store and a simple logic circuit can be used to serially add the three spoiler bits to the 11-bit block of concentration data.

Figure 9:
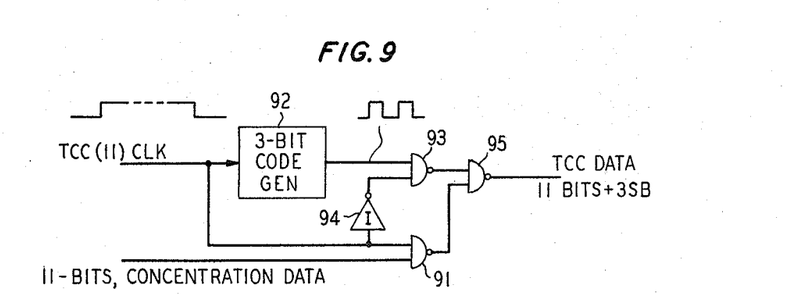

FIG. 9 shows a simple logic circuit for adding the three spoiler bits (101) to the 11-bit concentration data block. The 11-bits of concentration data, read out of the buffer store of the data terminal, is coupled to the NAND gate 91. These 11-bits are read out of buffer store in response to an access signal TCC (11) CLK. This latter access signal corresponds to the 14-bit length TCC CLK signal shown in FIG. 5, except that is high (a logical "1") for only eleven T4KCLK periods; i.e., it is high only till the $\div 14$ counter 33 counts to eleven. The counter 33 still counts to fourteen (14), as heretofore described, but additional combinational logic is used to extract the TCC (11) CLK. This 11-bit length TCC (11) CLK signal is now used to access the buffer store of the data terminal 25, instead of the TCC CLK signal, and it is also coupled to the logic circuit of FIG. 9. The TCC (11) CLK signal is delivered to the input of the 3-bit code generator 92 and to the NAND gate 91; it is also coupled to the input of the NAND gate 93 via the inverter 94. During the time that the counter 33 of FIG. 3 is counting to eleven, the NAND gate 91 is enabled by the TCC (11) CLK to pass the 11-bit concentration data bit block, read out of buffer store, to the enabled NAND gate 95. During this time, the NAND gate 93 is disabled by the inverted TCC (11) CLK signal. After the counter 33 counts to eleven (11), the TCC (11) CLK signal is terminated (it goes low) and the NAND gate 91 is thereby disabled. The trailing edge of the TCC (11) CLK signal triggers the 3-bit code generator 92 to generate the 3-bit code 101, which, of course, corresponds to the spoiler bit pattern that follows the concentration data. At this time, the inverted TCC (11) CLK serves to enable the NAND gate 93 to pass to 101 code pattern to the enabled NAND gate 95. The output of the circuit of FIG. 9 is, of course, the TCC DATA shown in FIG. 5, which comprises 11-bits of concentration data followed by the 101 spoiler bit pattern.

The spoiler bit (SB=0) which follows the "switch" data can be similarly placed in the data bit sequence by the simple expedient of permanently storing the same in the output buffer store of the data terminal 25 or, alternatively, it can be added to the 4-bit block of switch data by means of a simple logic circuit. Either alternative is quite straight-forward and well within the skill of one in the art and, therefore, further detailed discussion of the insertion of this spoiler bit (SB=0) into the data bit sequence is not believed necessary.

As previously noted, when a protection switch is to be made, a block of data bits (a 4-bit code word) indicative of the same is sent to the remote terminal. Since this code word comprises four bits, sixteen separate and distinct code words are, of course, possible. However, for the reasons set forth above, the 4-bit "switch" code word is restricted to 12 of the 16 possible codes. This restriction is readily accomplished by the simple expedient of just omitting the prohibited code words (0111, 1110, 1100, 1111) from the "dictionary" of stored words that the protection switch circuitry has access to. The remaining 12 code words are more than adequate for protection switching purposes.

Figure 6:
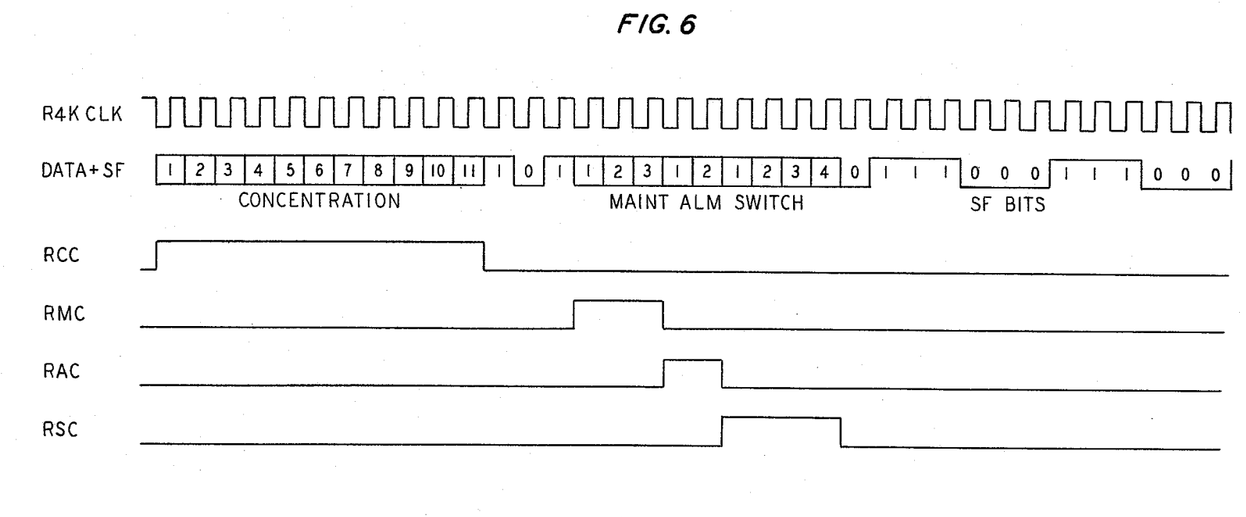
FIG. 6 shows certain waveforms useful in the explanation of the operation of the receive circuit of FIG. 4.

The receive circuit of the data link apparatus 24 of FIG. 2 is shown in FIG. 4 of the drawings. The waveforms of FIG. 6 are useful in understanding the operation of the receive circuit of FIG. 4. The receive circuit receives the incoming digital bit stream (RPCM) from the line interface unit 22 and the clock signal R4KCLK from the receive unit 23 and it utilizes the latter to first separate out the multiplexed subframe channel of signaling framing bits (SF) and interpolated DATA. The clock signal R4KCLK is shown in FIG. 6 of the drawings. The R4KCLK signal is a 4 kHz clock that is synchronous with the subframe bits—assuming, of course, that framing has been recovered and the receive channel bank is therefore in the in-frame condition. Given the in-frame condition, the generation of the synchronous clock signal R4KCLK is quite straight-forward and is currently carried out in digital channel banks.

The incoming RPCM signal is coupled to the D-input of the D-type flip-flop 40. The R4KCLK signal is coupled to the clock (CLK) input of the flip-flop 40; the occurrence of an input clock serves to transfer the D input to the Q output of flip-flop 40. Since R4KCLK is synchronous with and at the same rate as the subframe bits, the Q output of flip-flop 40 comprises just the subframe bits (DATA and SF). The output of flip-flop 40 is illustrated in FIG. 6 by the waveform labelled DATA+SF. This waveform comprises in sequence 11-bits of concentration data, 3 spoiler bits (101), the 3-bit maintenance bit block, the 2-bit alarm block, 4-bits of switch data followed by a spoiler bit (SB=0), and the signaling framing bits SF. A signaling framing pattern, of course, both precedes and follows each data sequence.

The Q output of flip-flop 40 is coupled to an input of the exclusive-OR circuit 41. The other input to this exclusive-OR is from the ÷12 counter 42, which has an output the same as the signaling subframe pattern, i.e., 111000111000... The exclusive-OR output is coupled to the D input of the D-type flip-flop 43. The flip-flop 43 and counter 42 are clocked by the R4KCLK signal. The Q output of flip-flop 43 is used to clear (CLR) the ÷12 counter 42 and thereby reset the same to its initial condition. The exclusive-OR 41, the ÷12 counter 42, the D-type flip-flop 43 and the manner in which these circuits are interconnected are the same as the interconnected exclusive-OR 71, ÷12 counter 72, and D-type flip-flop 73 of FIG. 7. Accordingly, as might be expected, the interconnected exclusive-OR 41, ÷12 counter 42 and flip-flop 43 of FIG. 4 operate in the same manner as the similar circuitry of FIG. 7 heretofore described. For convenience and to facilitate a ready understanding of the invention, essentially the same circuit has been shown separately in both FIG. 4 and FIG. 7. In practice, however, such redundancy would be avoided and only a single recovery circuit would be used.

When the output of the ÷12 counter 42 matches the signaling subframe pattern for 12 consecutive times, the counter 42 reaches, or counts to, state 12 and a "state 12" output signal from the counter is coupled to the clear (CLR) input of the divide-by-fourteen (÷14) counter 61 to set the same to its initial or cleared state. In practice, this "state 12" signal, used to clear the counter 61, would be obtained from the subframe recovery circuit of FIG. 7. This reset or clear of the counter 61 occurs immediately prior to the next sequence of data bit blocks. The ÷14 counter 61, the ÷3 counter 62, the ÷2 counter 63, the ÷5 counter 64 and their respective input NAND gates 65–68, as well as the manner in which these circuits are interconnected, are the same as the interconnected counters 33, 51, 53, 55 and their respective input NAND gates 34, 52, 54 and 56 of FIG. 3. Accordingly, the interconnected counters 61-64 and NAND gates 65-68 function in the same manner as the similar circuitry of FIG. 3 heretofore described. Very briefly, from its initial or cleared state, the ÷14 counter 61 counts to fourteen (14) in response to the R4KCLK signal coupled thereto by the enabled NAND gate 65. After reaching the count of 14, the counter 61 output serves to disable the NAND gate 65 and to set the ÷3 counter 62 to its initial or cleared state—all in a manner similar to that heretofore described. The counter 62 counts to three (3) in response to the input R4KCLK signal, and then after reaching the three count it disables itself by means of the NAND gate 66 and, at the same time, it sets the ÷2 counter 63 to the initial or cleared state. Counter 63 then counts to two (2), at which time the count is terminated and the ÷5 counter 64 cleared. The ÷5 counter 64 counts to five (5) and then its count is similarly terminated.

The counter 61 provides the receive concentration clock (RCC) signal shown in FIG. 6 of the drawings. This signal is high (a logical "1") for only eleven R4KCLK periods, i.e., it is high only till the ÷14 counter 61 counts to eleven. The counter 61 still counts to fourteen (14), as heretofore described, but additional combinational logic is used to extract the RCC signal.

The ÷3 counter 62 provides the receive maintenance clock (RMC) signal shown in FIG. 6 of the drawings. This signal is initiated after the ÷14 counter 61 counts out, and it is terminated after counter 62 reaches count three. The ÷2 counter 63 provides, at its output, the receive alarm clock (RAC) signal shown in FIG. 6 of the drawings. And the ÷5 counter 64 provides the receive switch clock (RSC) of 4-bits duration, also by the use of additional combinational logic.

The RCC, RMC, RAC and RSC clock signals are sent to the data terminal 25 where they are used to write the respective data bit blocks (i.e., concentration, maintenance, alarm, switch) into the input buffer store of the data terminal in accordance with known techniques. Alternatively, the data bit blocks can be separated out by simply ANDing the subframe channel bits (DATA and SF) with the RCC, RMC, RAC and RSC clock signals. The separated data blocks are then sent to storage in data terminal 25.

The ÷14, ÷12, ÷6, ÷5, ÷3 and ÷2 counters comprise regular binary counters with conventional combinational logic (e.g., AND/OR gates or NAND/NOR gates) selectively connected to the various counter stages to achieve the desired function. Counter circuits of this type are known in the art and are readily designed by those skilled in the art of circuit design.

It must be understood at this point that the foregoing disclosure is merely illustrative of the principles of the present invention and numerous modifications or alterations may be devised by those skilled in the art without departing from the spirit and scope of the invention.

I claim:

1. In a digital transmission system which comprises digital terminals and wherein a plurality of digital message signals are transmitted between terminals in a plurality of time division multiplexed channels, a terminal framing bit being included in the transmitted multiplexed signal in alternate frames, the least significant bit of each channel being borrowed for signaling purposes every 6th frame, with the location of the signaling bits being identified by the signaling framing pattern of 111000 . . . in the framing bit position of alternate frames, the bits of the signaling subframe channel alternating every frame with the terminal framing bits, said transmission system being characterized by means (FIG. 3 and FIG. 8) at a local terminal for time division multiplexing a data channel into the signaling subframe channel, said means serving to transmit the aforementioned signaling framing pattern in an intermittent periodic manner with predetermined data bit blocks of multiple data bits interposed between successive signaling framing patterns, signaling subframe recovery means (FIG. 7) at a remote terminal responsive to said signaling framing pattern for recovering the framing pattern embedded in the multiplexed subframe channel, and means (FIG. 4) responsive to said recovery means for separating out the data bits in the multiplexed subframe channel.

2. In a digital transmission system as defined in claim 1 including means (e.g., FIG. 9) for preventing false resynchronization of the subframe recovery means by placing a limitation on the data transmitted in the subframe channel.

3. In a digital transmission system as defined in claim 2 wherein the prevention means comprises means (FIG. 9) for inserting spoiler bits in predetermined positions in the data bit sequence to aid in the prevention of false resynchronization of the subframe recovery means.

4. In a digital transmission system as defined in claim 1 wherein the last-recited means comprises means (61-64) for generating one or more clock signals that are concurrent with preselected data bits of the data channel.

5. In a digital transmission system as defined in claim 1 wherein the subframe recovery means comprises means (72, or 42) for generating a digital signal having a repetition rate the same as the subframe bit rate and a bit sequence that corresponds to the signaling framing pattern, means (71, or 41) for comparing the generated digital signal with the signaling framing pattern, and means (73, or 43) responsive to the output of the comparison means for resetting the means for generating a digital signal when the compared bit patterns do not match.

6. In a digital transmission system as defined in claim 5 wherein an enabling signal (state 12) is delivered to said means responsive to the recovery means when the compared bit patterns match a predetermined number of times.

7. In a digital transmission system which comprises a local and a remote digital channel bank terminal and wherein a plurality of digital message signals are transmitted between terminals in a plurality of time division multiplexed channels, a terminal framing bit being included in the transmitted multiplexed signal in alternate frames, the least significant bit of each channel being borrowed for signaling purposes every 6th frame, with the location of the signaling bits being identified by a predetermined pattern of signaling framing bits (111000 . . . ) disposed in the framing bit positions of alternate frames, the bits of the signaling subframe channel alternating every frame with the terminal framing bits, said transmission system being characterized by means (FIG. 3 and FIG. 8) at the local terminal for time division multiplexing a data channel into the signaling subframe channel by transmitting the signaling framing pattern in an intermittent periodic manner with preselected data bit blocks interposed therebetween, means (72, or 42) at the remote terminal for generating a digital bit sequence with a repetition rate the same as the signaling framing bit rate and a bit sequence that is the same as the signaling framing pattern, comparison means (71, or 41) for comparing said digital bit sequence with the signaling framing bit sequence, means (73, or 42) responsive to the output of said comparison means for resetting the digital bit sequence generating means when the compared bit sequences do not match, said sequence generating means serving to generate an enabling signal when the compared bit sequences match a predetermined number of times, means (FIG. 4) responsive to said enabling signal for generating clock signals which serve to separate out the data bits in the multiplexed subframe channel, free-running counting means (74) for counting at the incoming frame rate and for generating an enabling signal every 6th frame for use in extracting the signaling bits from the incoming multiplexed bit stream, means (state 12 lead) for coupling said enabling signal to said free-running counting means to synchronize the same to the incoming subframe pattern, and means (e.g. FIG. 9) for preventing false resynchronization of the digital bit sequence generating means including means at the local terminal for inserting preselected spoiler bits at predetermined positions in the data bit sequence.

* * * * *